United States Patent [19]

Rask

[11] Patent Number: 5,803,047
[45] Date of Patent: Sep. 8, 1998

[54] METHOD OF CONTROL SYSTEM FOR CONTROLLING COMBUSTION ENGINES

[75] Inventor: Patrik Rask, Karlstad, Sweden

[73] Assignee: Mecel AB, Sweden

[21] Appl. No.: 839,352

[22] Filed: Apr. 17, 1997

[51] Int. Cl.[6] .............................. F02P 41/14; F02P 5/152
[52] U.S. Cl. .......................................... 123/425; 123/435
[58] Field of Search ...................................... 123/425, 435

[56] References Cited

U.S. PATENT DOCUMENTS

| | | | |
|---|---|---|---|
| 4,377,140 | 3/1983 | Latsch | 123/425 |
| 5,425,339 | 6/1995 | Fukui | 123/416 |
| 5,676,113 | 10/1997 | Johansson et al. | 123/425 |

*Primary Examiner*—Andrew M. Dolinar
*Attorney, Agent, or Firm*—Ostrolenk, Faber, Gerb & Soffen, LLP

[57] ABSTRACT

A method and system for optimal control of a combustion engine, where the control could be initiated without the risk of provoking or worsening a knocking condition which could cause engine damages, the control system including an integrating circuit 61-62, which integrates a signal from each combustion event, the signal being dependent on the degree of ionization. The integrated value thus obtained is an indicative measure of the combustion quality and when peak power is needed engine control could strive to optimize the integrated value. The integrated value increases dramatically during knocking conditions which is the reason why a cascade connected reducing circuit 63-64-65 must reduce the integrated value obtained from circuits 61-62. The reduction, which reduction is dependent on the intensity of the knocking condition, is obtained in a final circuit 66. A control could thus be implemented where the knock intensity reduced integrated value could be used as maximizing criteria when controlling a control parameter of the engine, preferably fuel amount, without risking that a harmful knocking condition is provoked or made worse.

12 Claims, 4 Drawing Sheets

METHOD OF CONTROL SYSTEM FOR CONTROLLING COMBUSTION ENGINES

The present invention relates to a method and system for controlling combustion engines.

BACKGROUND OF THE INVENTION

U.S. Pat. No. 5,425,339 discloses a method for controlling a combustion engine where the ionization within a combustion chamber is detected, and an ionization signal corresponding to the ionization is used as feedback information from the combustion. The parameters of the engine are controlled in such a manner that the integrated value of the ionization signal or, alternatively, the product of the peak value of the ionization signal and the duration of the ionization signal, is continuously maximized. Implementation of this solution will result in an engine operating at certain operating conditions to be forced into an uncontrolled knocking condition, causing excessive temperatures and eventually engine failure. When the combustion engine is subjected to a knocking condition, the integrated value of the ionization signal will also increase. A controller operating with the functionality according to U.S. Pat. No. 5,425,339, will interpret the situation as approval of a further control adjustment in a direction causing increase of the integrated value of the ionization signal, which will further aggravate the knocking condition. This will lead to the knocking condition becoming stationary, and often worse causing rapid increase of temperature and subsequent engine failure.

Knocking in the full load operating range of the engine is often the natural consequence if the engine is optimized for increased compression ratio in the part load operating range. Part load optimization is important because the main part of the operation of a vehicle engine occurs at part load. This has a major impact on average fuel consumption. A knocking condition may also be provoked by decreasing the fuel amount in the lean direction to such an extent that the combustion temperature starts to increase. Such fuel induces a certain cooling effect upon the combustion, and a knocking condition may often be counteracted by enrichment of the air-fuel mixture. Both compression ratio increases and lean limit control are important components in order to reduce fuel consumption and reduction of harmful emissions.

A knocking condition during combustion occurs when the propagation speed of the flame front within the cylinder approaches the speed of sound. This occurs mainly during the end of the combustion process when the combustion gases already are subjected to a high order of compression and are at high temperatures. In comparison with normal combustion, high pressure oscillations will be induced during knocking, which oscillations propagate at the speed of sound and cause damages to the piston, sealing rings and cylinder head.

Modern optimized engines demand an accurate detection of a knocking condition and efficient control measures in order to counteract the condition. It is thus of utmost importance that control algorithms will not affect the engine such that a knocking condition is provoked to a stationary state or will not aggravate a knocking condition.

SUMMARY OF THE INVENTION

An object of the invention is to optimize the combustion in a combustion engine without the risk of controlling the engine such that a knocking condition results which, in turn, might cause the engine to overheat with resulting engine damage.

Another object is to be able to control the engine towards an optimal lean air fuel mixture which does not cause a knocking condition, or is as close as possible to an unacceptable knocking condition.

Yet another object in an advantageous embodiment is that control of the engine, dependent on knocking and combustion quality, may be obtained without using any other sensors other than the ignition plug arranged within the combustion chambers, the ignition plug being used to detect the ionization within the combustion chamber in order to determine a knocking condition, as well as combustion quality.

The foregoing and other objects are achieved in accordance with one aspect of the invention by a method for controlling a two-stroke or four stroke combustion engine of the Otto-type in order to obtain an optimum combustion, which method comprises the steps of: detecting the degree of ionization within a combustion chamber of the engine; generating an ionization signal corresponding to the degree of ionization; detecting whether a knocking condition from combustion occurs; integrating the signal corresponding to the degree of ionization during a measuring window kept open from after the generation of an ignition spark in association to the upper dead position of a piston of the combustion chamber and at least until 40 crankshaft degrees after upper dead position of the piston, whereby an integrated value of the ionization signal is obtained; varying a control parameter of the engine in such a manner that the integrated value of the ionization signal is maximized during an essentially non-knocking condition; and if a knocking condition occurs, reducing the integrated value of the ionization signal to form a corrected integrated value of the ionization signal.

In accordance with another aspect, the invention is directed to a fuel control system for a combustion engine having at least one combustion chamber, which system comprises: a position sensor which generates at least one reference position corresponding to a determined crankshaft position for a cylinder of the engine; an ionization current sensor arranged within the cylinder, which sensor detects the degree of ionization within the cylinder during combustion and produces an ionization signal dependent on the degree of ionization; and integrating measuring circuit responsive to the ionization signal, which integrating circuit from a first crank angle position in association to the upper dead position of the piston and until a second crank angle position at least 40 crankshaft degrees after the first crank angle position, integrates the ionization signal developed during the combustion, and from each combustion produces an integrated value of the ionization signal; a knock sensor for detecting a knocking condition developed during combustion which sensor produces a knock signal proportioned to the intensity of the knocking condition; a signal correcting circuit for reducing the integrated value of the ionization signal dependent on the intensity of the knock signal to form a corrected integrated value of the ionization signal; and a control unit having a memory which continuously varies at least one control parameter of the engine according to a predetermined control algorithm stored in the memory of the control unit, which control algorithm maximizes the corrected integrated value of the ionization signal.

By the inventive method and system a combustion engine may be controlled in an optimal manner, with low fuel consumption and low emission levels, without risking engine damage. With the method and control system an optimal high power output may also be obtained, especially for high speed engines of the two-stroke type, even in operating ranges of the engine where a knocking condition easily could occur.

Other distinguishing features and advantages of the invention will appear from the following description of a preferred embodiment. The description is made by reference to the figures specified in the following list of figures.

DESCRIPTION OF EXEMPLARY EMBODIMENTS

Figure 1:
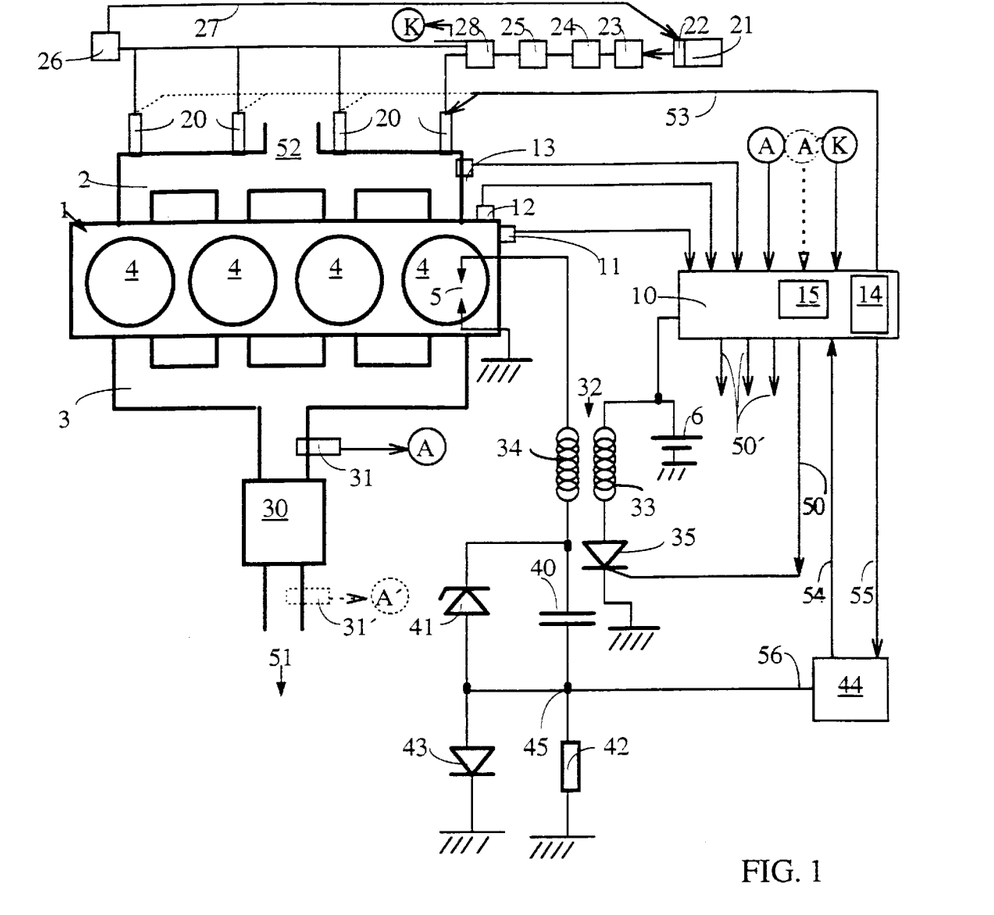
FIG. 1 shows schematically an arrangement for controlling a combustion engine and detection of the degree of ionization within the combustion chamber.

In FIG. 1 is shown an arrangement for controlling a combustion engine 1 which includes a fully electronic control system for the fuel supply, as well as ignition timing for the combustion engine. A control unit 10, such as a microcomputer, controls the ignition timing, as well as the amount of fuel supplied dependent on engine speed, engine temperature and load of engine, detected by the sensors 11, 12, 13, respectively. The sensor 11 is preferably a conventional type of pulse-transmitter which detects cogs at the outer periphery of the flywheel. A positioning signal could also be obtained by the sensor 11, by one or some cogs having varying tooth width, or, alternatively, varying tooth gap, at a stationary crankshaft position.

The control unit 10 includes a customary type of arithmetic unit 15 and associated memories 14, storing control algorithms, fuel maps and ignition timing maps.

At least one spark plug 5 is arranged in each cylinder, only one spark plug intended for a cylinder shown in FIG. 1. The ignition voltage is generated in an ignition coil 32 having a primary winding 33 and a secondary winding 34. One end of the primary winding 33 is connected to a voltage source, such as a battery 6, and the other end connected to ground via an electrically controlled switch 35. A current starts to flow through the primary winding 33 when the control output 50 of the control unit 10 switches the switch 35 to a conductive state. When the current is cut out a step up transformation of the ignition voltage will be obtained in the secondary winding 34 of the ignition coil 32 in a conventional manner, and an ignition spark will be generated in the spark gap 5.

Start and stop of the current flow, so called dwell-time control, is controlled dependent on the present parameters of the engine and according to a pre-stored ignition map in the memory 14 of the control unit 10. Dwell-time control controls that the primary current reaches the level necessary and that the ignition spark is generated at the ignition timing necessary for the present load case. One end of the secondary winding is connected to the spark plug 5, and the other end, which is connected to ground, includes a detector circuit detecting the degree of ionization within the combustion chamber. The detector circuit includes a voltage accumulator, here in the form of a chargeable capacitor 40, which biases the spark gap of the ignition plug with a substantially constant measuring voltage. The capacitor is equivalent to the embodiment shown in EP,C,188180, where the voltage accumulator is a step-up transformed voltage from the charging circuit of a capacitive type of ignition system. In the embodiment shown in FIG. 1, the capacitor 40 is charged when the ignition pulse is generated to a voltage level given by the break-down voltage of the zener diode 41. This break-down voltage could lie in the interval between 80–400 volts. When the stepped up ignition voltage, about 3040 kVolts, is generated in the secondary winding, the zener diode breaks down which assures that the capacitor 40 will not be charged to a higher voltage level than the break-down voltage of the zener diode. In parallel with the measuring resistance 42 is a protecting diode connected with reversed polarity, which in a corresponding manner protects against over voltages of reversed polarity. The current in the circuit 5-34-40/40-42-ground could be detected at the measuring resistance 42, which current is dependent on the conductivity of the combustion gases in the combustion chamber. The conductivity, in turn, is dependent on the degree of ionization within the combustion chamber.

By the measuring resistance 42 being connected close to ground only one connection to the measuring point 45 is necessary for the detector circuit 44. The detector circuit 44 measures the potential over the resistance 42 in measuring point 45 relative to ground. By analyzing the current, or alternatively the voltage, through the measuring resistance a knocking condition or preignition could, among other conditions, be detected. As has been mentioned in U.S. Pat. No. 4,535,740, during certain operating cases the present air-fuel ratio could also be detected by measuring how long the ionization current is above a certain level.

With a lambda sensor 31 arranged in the exhaust manifold of the combustion engine, as seen in the flow of exhaust upstream of a catalyst 30 arranged in the exhaust manifold, the residual amount of oxygen could be detected, and hence, also the present mixture ratio of air-fuel could be detected. With a conventional narrow-banded lambda sensor, having an output signal with a distinct transition just below stoichiometric mixtures, the fuel amount given from a stored fuel map could be corrected. The correction is made in order to maintain the ideal mixture ratio of air-fuel for the function of the catalyst 30. Using the output signal A from the lambda sensor a feed back control of the fuel supply could be obtained, which control is performed in such a way that the output signal from the lambda sensor oscillates between a high and a low output signal up to a couple of times per second. The fuel supply system of the combustion engine includes in a conventional manner a fuel tank 21 having a fuel pump 22 arranged in the tank. The pressurized fuel is supplied from the pump 22 to a pressure equalizer 23, and further on to a fuel filter 24 and other containers 25, or volumes, including the fuel rail. A pressure regulator 26 is arranged at one end of the fuel rail, which at exceeding pressures opens for a return flow in the return line 27, back to the fuel tank 21 or the fuel pump 22. An alternative to a pressure regulator 26 opening at excessive pressures could be a pressure controlled fuel pump, whereby the return line 27 could be avoided. The accumulated volumes of the fuel pump unit 22, the pressure equalizer 23, the fuel filter 24 and other cavities or volumes 25, are of such order that operation for a couple of minutes could take place before a new type of fuel being fueled to the tank reaches the fuel injectors 20. The fuel injectors 20 are preferably arranged in the inlet channel of each cylinder, and preferably operated sequentially in synchronism with the opening of the respective inlet valves of the cylinders. The amount of fuel supplied is determined by the length of the control pulse emitted by the control unit 10 to each fuel injector. The amount of fuel, as well as ignition timing, is controlled dependent on present engine parameters according to prestored fuel- and ignition timing maps contained in the memory 14 of the control unit 10. The fuel amount given by the map could possibly be corrected by the lambda sensor output.

In a certain type of fuel control system, a fuel quality sensor 28 could also be arranged in the fuel supply system. The fuel control could with a fuel quality sensor 28 be adjusted to the present octane number or mixture ratio of methanol and petrol. The control unit 10 obtains an input signal K from the fuel quality sensor, indicating the present fuel quality.

Figure 2:
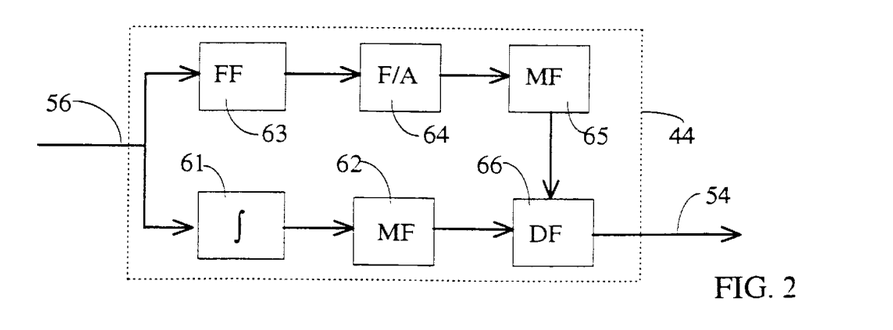
FIG. 2 shows schematically a first embodiment of an inventive controller.

In FIG. 2 is shown an inventive signal conditioning circuit of the detector circuit 44. The detector circuit 44 receives at line 56 a signal corresponding to the degree of ionization. This ionization signal is separately handled by two conditioning circuits connected in cascade. In one of the conditioning circuits the ionization signal is integrated in a integrator 61. The integrated value is subsequently averaged in an averaging filter 62.

In the other conditioning circuit, simultaneously the high frequency content of the ionization signal is filtered out in a band-pass filter 63, which high frequency content corresponds to the frequencies generated during a knocking condition, preferably exceeding 5 kHz. The frequency content representative of a knocking condition is subsequently passed over to a converter 64, which converts the frequency content to an analog signal proportional to the intensity of the knocking condition. The converter, known, per se, could preferably contain a rectifier, which rectifies the alternating voltage type of signal from the band-pass filter 63 and subsequently integrates the rectified signal in an integrator. The integrated signal thus formed will be proportional to the superposed frequency content of the ionization signal, and the intensity of a knocking condition. Before a more detailed description of the last elements 65–66 in the signal conditioning circuit is made, reference will be made to FIGS. 3–6 which demonstrated the effects of the ionization signal and the integrated value as a result of a knocking condition.

Figure 3:
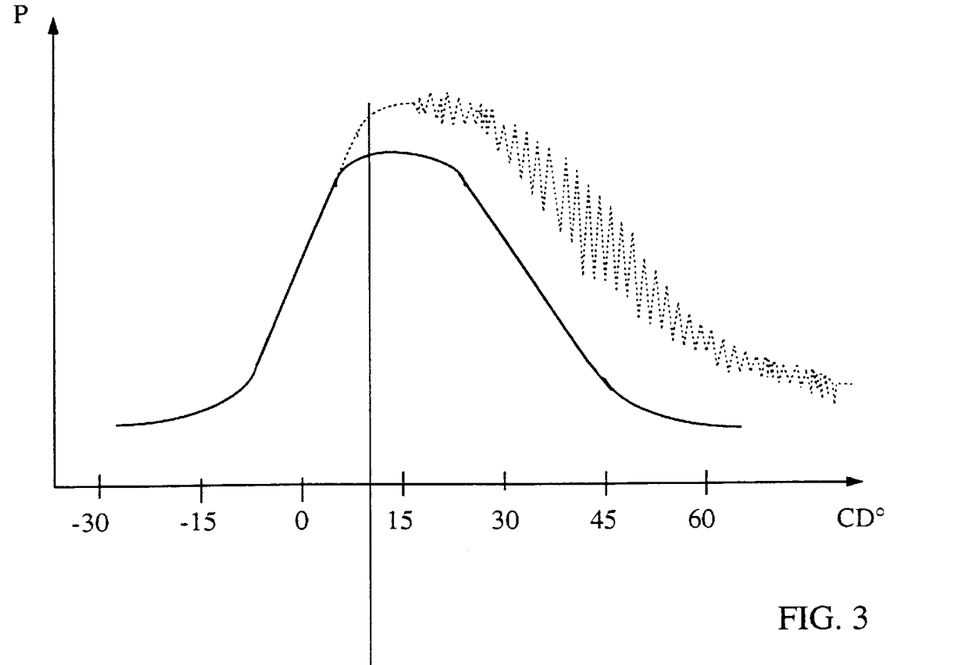
FIG. 3 shows the pressure within the combustion chamber during normal combustion and during combustion at knocking conditions.

In FIG. 3 is shown in an unbroken plot the combustion pressure P as detected with a pressure sensor arranged within the combustion chamber, as a function of different crank angle degrees CD° during a normal combustion without knocking. A broken plot shows the combustion pressure as a function of different crank angle degrees during a knocking condition, but with all other parameters identical. As should be appreciated, the amplitude of pressure increases during knocking conditions.

Figure 4:
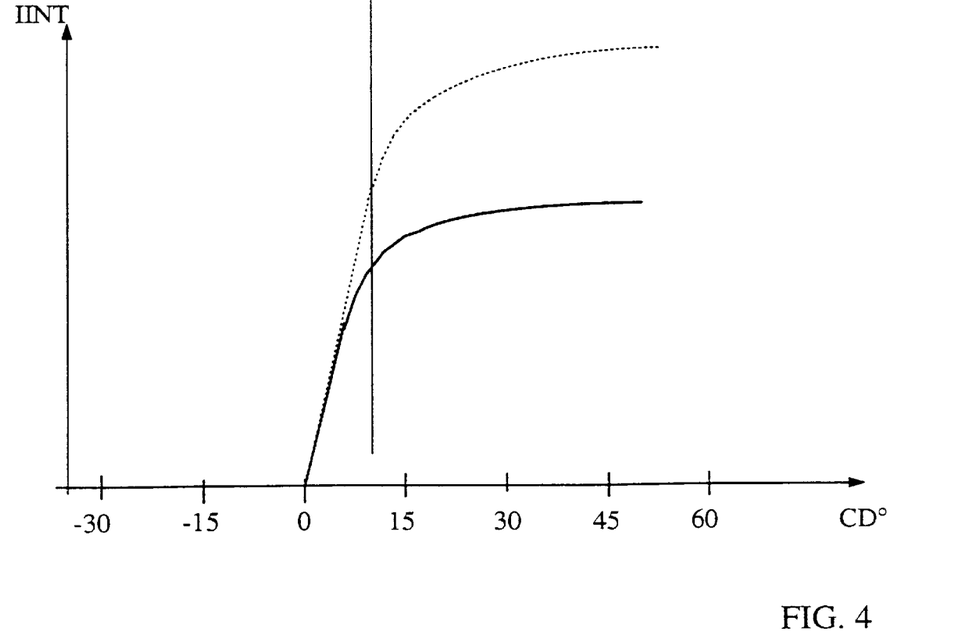
FIG. 4 shows how the integrated value of the ionization signal increases during normal combustion and during combustion at knocking conditions.

In FIG. 4 is shown in an unbroken plot how the integrated value of the ionization signal IINT increases during normal combustion, while a broken plot shows how IINT increases during a combustion with a knocking condition. The integrated value of the ionization signal is established in a measuring window starting at upper dead center, where the crank angle correspond to 0 degrees. The degree of ionization within a combustion chamber increases with pressure as well as temperature. This will also cause an increase of the integrated value of the ionization signal during a knocking condition.

A control where the integrated value is maximized will thus lead to amplification of control measures that will promote a knocking condition and result in the combustion engine risking a locked condition with heavy knocking.

Figure 5:
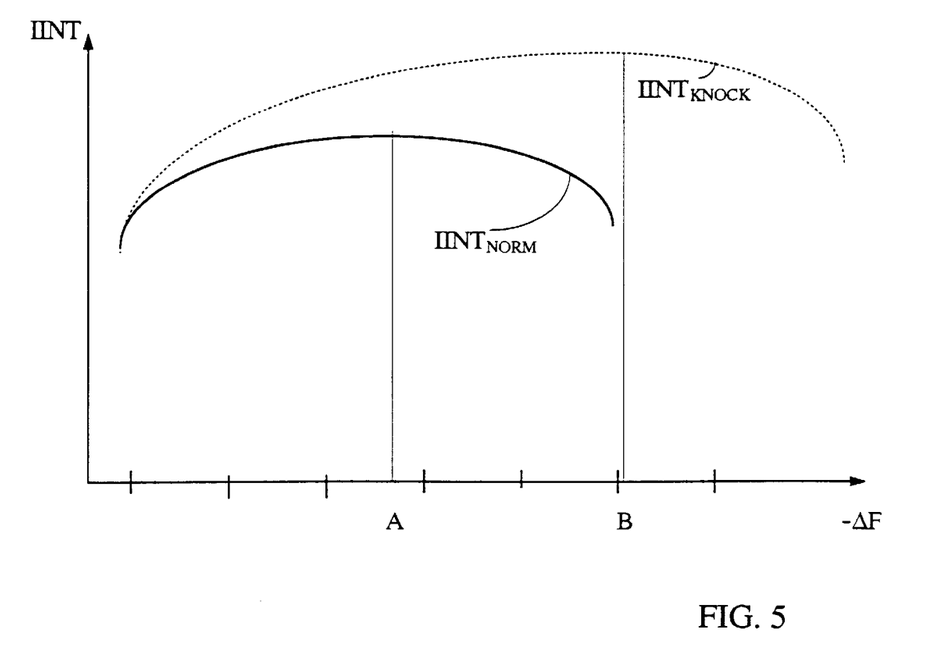
FIG. 5 shows how the integrated value of the ionization signal varies when the fuel amount is decreased in the lean direction during normal combustion and during combustion at knocking conditions.

In FIG. 5 is shown an example where control of fuel in the lean direction, towards the right at the Xaxis, is implemented in order to find the operating condition where the integrated value of the ionization signal IINT reaches its maximum.

When no knocking occurs the optimal operating state could be obtained with a amount of fuel where control in the lean direction has been in effect with a correcting and reducing amount A of fuel. Increase and decrease of the fuel reducing amount will cause a decrease of the integrated value of the ionization signal IINT.

If instead a knocking condition should occur during lean limit control, then the integrated value will obtain its maximum value at a different and leaner amount of fuel, where the fuel reduction –AF is larger, i.e., with the fuel reducing amount B in FIG. 5. Knocking is a limiting constriction during lean limit control, which knocking condition is provoked by excessive lean air fuel mixtures. If a controller is used, by which the integrated value of the ionization signal is maximized, then a heavy knocking condition will appear at high engine speeds (rpm's) and high engine load, where the knocking condition rapidly causes overheating and engine damage.

An effect arising from a knocking condition is that the combustion chamber or exposed parts thereof are heated locally by the knocking condition, resulting in the possibility that subsequent combustions in the same combustion chamber could cause an increase of the ionization signal and the integrated value, even though the knocking condition has ceased.

Temperature of combustion residual gases, obtained from natural EGR and/or insufficient fresh air flow in two-stroke engines could also exhibit increased values following a knocking condition, which could increase the ionization signal. The degree of ionization increases with pressure as well as temperature within the cylinder.

The normal control measure during a knocking condition is a rapid retardation of the ignition timing, and maintaining the retarded ignition timing during a predetermined time interval or an engine speed dependent time interval, thus enabling seizure of the knocking condition and sufficient time for the combustion chamber to assume normal temperature. Another alternative or complement is to increase the fuel amount, obtaining richer air fuel mixtures, to the knocking cylinder. In a corresponding manner the rich mixture is maintained during a predetermined time interval or an engine speed dependent time interval, thus enabling seizure of the knocking condition and sufficient time for the combustion chamber to assume normal temperature. In supercharged engines the knocking condition could be counteracted by reduction of the charge pressure, but this affects all cylinders, even non-knocking cylinders, if conventional types of superchargers are used. Also, when charge pressure reduction is used to counteract a knocking condition, a certain predetermined time interval or engine speed dependent time interval is required for the control measure to be in effect. A knocking condition could also be counteracted by injecting water into the combustion chamber, which method also could be used as a preventive measure at operating limits of the engine, often at maximum load and high speed.

After this demonstration of the effects upon the ionization signal and the integrated value thereof, as a result of a knocking condition, reference is made back to FIG. 2. The analog signal obtained from the converter 64, which signal is proportional to the intensity of the knocking condition, is subsequently averaged in an averaging filter 65.

In an attenuating filter in the last element 66 an attenuation of the averaged value of the ionization signal is obtained. The level of attenuation, or reduction, is dependent on the current level of the averaged signal, obtained from element 65, being proportional to the intensity of the knocking condition. The final output from element 66 will thus form a corrected integrated value of the ionization signal.

Figure 6:
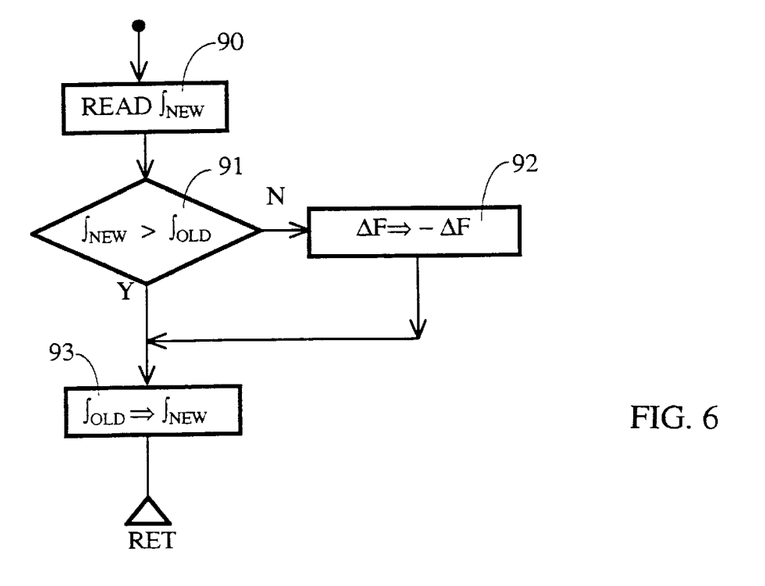
FIG. 6 shows a basic control algorithm, which maximizes a knock reduced value of the integrated ionization signal.

The control unit 10 could, for example, by using a control algorithm stored in the memory 14, initiate a dilution control of the air fuel mixture in the lean direction, preferably by fuel amount control, in such a manner that the signal obtained at output 54 is maximized, i.e., that the dependent on knocking intensity corrected integrated value of the ionization signal is maximized. In FIG. 6 is shown in principle such a control algorithm, which maximizes the dependent on knocking intensity reduced integrated value of the ionization signal.

A control in the lean direction could, for example, be initiated by the microprocessor 10 at substantially stationary load of the engine, i.e., steady state, and implemented by successive reduction of the current fuel amount dictated by the fuel map in predetermined incremental fuel amount steps AF. After at least one combustion at the reduced level of fuel amount, the latest obtained reduced integrated value of the ionization signal $\int_{NEW}$ is sampled at line 54 in control step 90. In the next control step 91 the latest sampled value $\int_{NEW}$ is compared with the preceding value of the ionization signal $\int_{OLD}$ obtained from a combustion with non reduced fuel amount. If the control measure has resulted in an increase of the value $\int_{NEW}$, as compared with $\int_{OLD}$, then the initiated reduction of the fuel amount proceeds with an additional incremental reduction AF of the fuel amount. If the control measure instead results in a decrease of the value $\int_{NEW}$, as compared with $\int_{OLD}$, then the algorithm proceeds to control step 92, where the sign of the incrementally correcting fuel amount is changed, which will change the direction of control from lean to rich, or vice versa. Before returning to the main program of the control unit the current value of $\int_{NEW}$ is stored as a replacing value for $\int_{OLD}$, for subsequent use by the control unit 10 during any following correcting of the fuel amount. In a corresponding manner the control unit 10 could correct the ignition timing in incremental steps, in such a manner that the corrected integrated value of the ionization signal is maximized. The ignition timing could thus be forced towards an optimum ignition timing advance but with a safe margin against a knocking condition because the integrated value is reduced dependent on the intensity of any knocking condition. Also the level of charge pressure could be increased incrementally in a corresponding manner.

The averaging in control element 62 is needed in order to stabilize the controller, and not to be affected by the large cycle-to-cycle variations occurring between successive combustions. The averaging is preferably implemented as a running average, where a part of the current value, i.e., the latest sampled integrated value, is averaged with the preceding averaged value. In this manner temporary disturbances or variations will not cause a major impact upon the averaged signal, which results in increased stability of the controller. The averaging filter could preferably form an output signal given by the following equation:

$$y(k)=K_m \cdot y(k-1)+(1-K_m)\cdot x(k)$$

where $K_m$ is the averaging factor, which defines the weighted impact on the established averaged value from preceding values, and x corresponds to the latest value sampled.

In a practical implementation the averaging factor $K_m$ could be set to 0.95 in the control element 62, roughly corresponding to an averaging over 30 consecutive measured values, which is made rapidly in a combustion engine.

The averaging in control element 65 is required in order to maintain a reduction of the integrated value of the ionization signal for succeeding combustions after a knocking event, thus compensating for any remaining elevated temperatures of the combustion chamber caused by any preceding knocking condition. How this averaging is implemented must be adapted to the disposition to cause knock for each type of engine, and for the length of time any knock induced elevated temperatures remain after a knocking condition.

During certain field tests, the remaining elevated temperatures, which cause increases of the integrated value of the ionization signal, have been attenuated after 1–2 succeeding non knocking combustions. In other type of engines the elevated temperatures remain during some tens of consecutive combustions.

The averaging in control element 65 could for a particular type of engine be formed from a limited number of consecutive combustions, where the new average Ma thus formed after the latest combustion n, preferably is established from the 3 latest preceding combustion's, and could follow the equation;

$$M_n=(k_1 \cdot \text{IONSign})+(k_2 \cdot M_{n-1})+(k_3 \cdot M_{n-2}),$$

where, $k_1$–$k_3$ are constants,

IONSign is the current signal from control step 64, and $M_{n-1}$ and $M_{n-2}$ are the latest averaged values from preceding combustions n–1 respectively n–2.

The successively decreasing constants $k_2$–$k_3$ will induce an attenuation of the ionization integral adapted to any remaining elevated temperatures caused by preceding combustions with knock. In certain applications, the temperature elevating effect, increasing the ionization, is of greater magnitude for the next succeeding combustion following immediately after a knocking condition which, for the application in question, will mean that k2 is greater than k1. The relations between constants could differ between different type of engines, and must be tested for each type of engine in question. For a certain engine tested the remaining elevated temperatures are fully attenuated after 3 consecutive combustions, but other terms ($k4 \cdot M_{n-3}$ + . . . and so on) could be used if elevated temperatures remains longer than 3 consecutive combustions.

If an increased response should be obtained dependent on a spontaneous knocking condition, then during specific conditions the average M formed could be established only from, or to a major extent from, the current signal from control element 64. A specific condition could be established if IONSign sampled from the latest combustion exceeds the preceding sampled IONSign more than 20–40%; then the new average $M_n$ could be established from the equation;

$$M_n=(K_1 \cdot \text{IONSign}),$$

where $K_1 > k_1$, $k_2$, or $k_3$.

For each succeeding combustion is thereafter an additional term, $k_2 \cdot M_{n-1}$ added to the successively updated average.

In an alternative embodiment, not shown, implemented in conventional type of systems, having an individual control algorithm for knock control, the knock control should always be given higher priority than the algorithm optimizing the integrated value of the ionization signal when the intensity of knock is above a predetermined threshold. This predetermined threshold could correspond to, for each type of engine, a limited acceptable degree of knock, for example, only occasional individual knocking events at longer intermediate intervals between each knocking event, which in a continuous state do not risk engine damage. Alternatively, initiated knock attenuating control measures could be given a higher priority dependent on the intensity of the knocking condition compared with control measures initiated in order to optimize the integrated value of the ionization signal. As long as an acute knocking condition is detected, which could correspond to a knock intensity above a predetermined threshold, knock attenuating control measures could always be given higher priority than control measures striving to increase the integrated value of the ionization signal. A corresponding priority is obtained by the reduction of the integrated value of the ionization signal if the reduction is proportional to the intensity of the knocking condition. A very low order of knock intensity could only induce a marginal reduction of the integrated value of the ionization signal which, in practice, will allow a limited and non damaging knocking condition to be developed in continuous operation.

Figure 7:
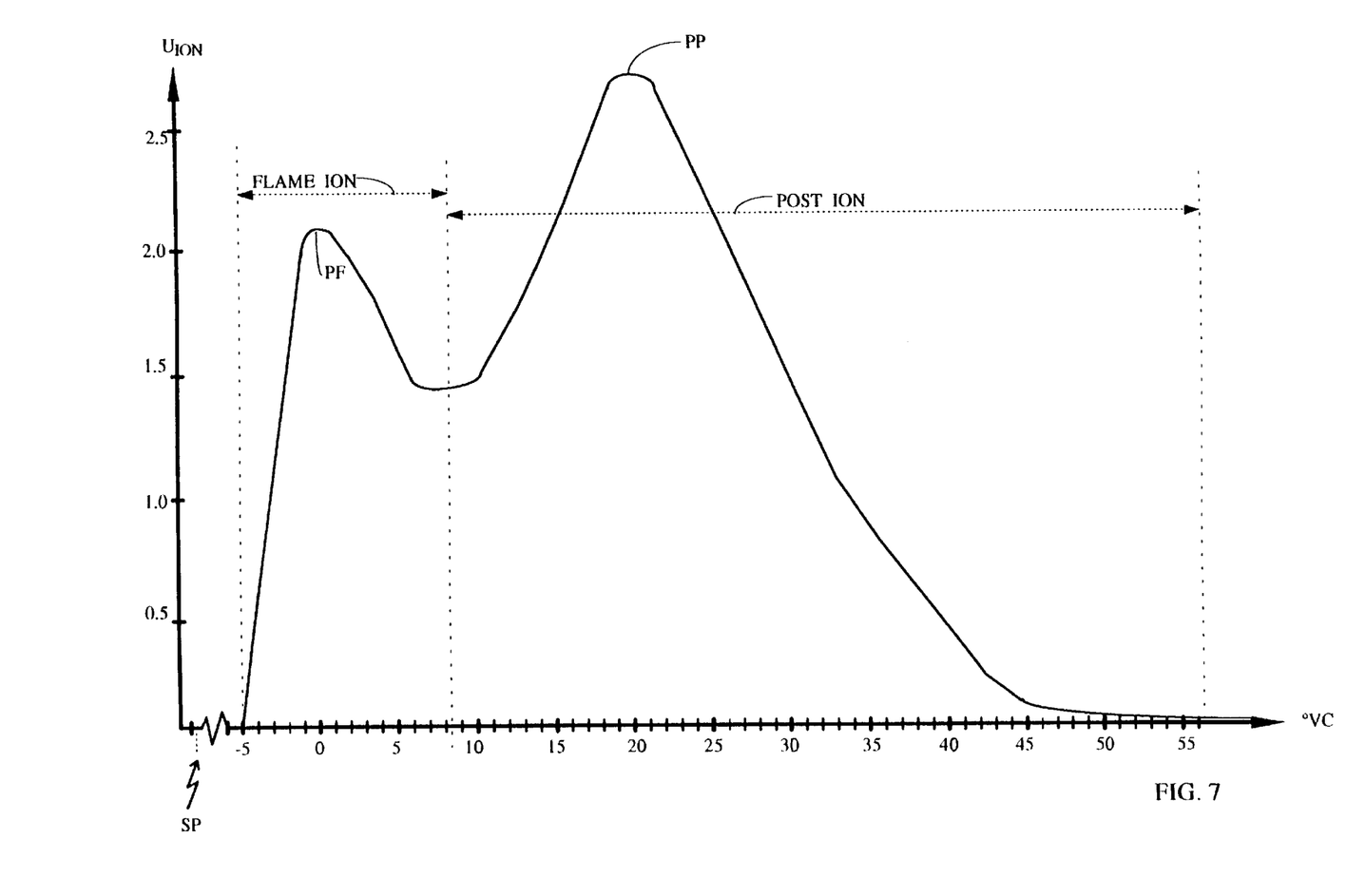
FIG. 7 shows a typical ionization signal, as detected with an arrangement shown in FIG. 1.

In FIG. 7 is schematically shown the signal $U_{ION}$ obtained at line 56, using a measuring arrangement according to FIG. 1. The level of $U_{ION}$ is plotted at the Y-axis, and in this case measured in volts, and could typically lie in the range 0–2.5 volts. At the X-axis is plotted crankshaft degrees, °VC, where 0° corresponds to the upper dead position, i.e., when the piston is in its uppermost position. At the position SP, a position before the upper dead position and typically 15–20 crankshaft degrees before the upper dead position, the ignition spark is generated at the ignition timing advance suitable for current operating conditions of the engine, basically dependent on load and speed. The generation of spark induces a high pulse in the measuring circuit, caused by the flash over in the spark plug gap during the so called Break down phase. This high pulse is filtered out, and the measured value induced is not used in the preferred embodiment.

Sampling of measured values is preferably controlled by the control unit 10 in such a manner that the control unit only sample the signal at 54 at certain determined positions or timings, i.e., during determined measuring windows. These measuring windows could be activated dependent on the spark 11 timing SP, such that the measuring window opens a sufficiently long time interval after proper attenuation of the spark generation phase.

After the spark generation phase a flame ionization phase will commence, in FIG. 7 denoted FLAME ION, during which phase the measuring voltage is affected by the establishment of a burning kernel of the air fuel mixture within or close to the spark plug gap.

After the flame ionization phase a post ionization phase will commence, in FIG. 7 denoted POST ION, during which phase the measuring voltage is affected by the combustion within the combustion chamber because the number of ionizing particles increases with temperature and pressure. POST ION typically reaches its maximum value, denoted PP in FIG. 7, when the combustion pressure reaches its maximum value and the flame front has reached the walls of the combustion chamber, which induces a pressure increase. The current measuring window during which the ionization signal is integrated should be designed as wide as possible in order to obtain the highest possible resolution. The measuring window should at least cover the entire post ionization phase, but preferably also the flame ionization phase or parts thereof. The activation of the measuring window could be controlled by the ignition timing, but should preferably be activated within the interval from −5 crankshaft degrees before upper dead position and until at least 40 crankshaft degrees after upper dead position. The measuring window could in certain types of applications be activated until 180 crankshaft degrees after the upper dead position, i.e., until the piston reaches its lower dead position, in order to monitor extended post ionization phases caused by inferior fuel qualities or extremely diluted air fuel mixtures, which causes a slow burn rate in the combustion chamber.

The invention could within the scope of the claims be modified in a number of ways. Detection of knock does not necessarily have to be made using the ignition plugs of the combustion engine, as shown in FIG. 1. Detection of a knocking condition could also be made using a separate measuring gap. Detection of knock could also be made using a conventional knock sensor of the accelerometer type, located on the engine cylinder housing., which sensors detects vibrations typical for a knocking condition propagating in the housing.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. Method for controlling a two-stroke or four stroke combustion engine of the Otto-type in order to obtain an optimum combustion, which method comprises the steps of:

detecting the degree of ionization within a combustion chamber of the engine;

generating an ionization signal corresponding to the degree of ionization;

detecting whether a knocking condition from combustion occurs;

integrating the signal corresponding to the degree of ionization during a measuring window kept open from after the generation of an ignition spark in association to the upper dead position of a piston of the combustion chamber and at least until 40 crankshaft degrees after upper dead position of the piston, whereby an integrated value of the ionization signal is obtained;

varying a control parameter of the engine in such a manner that the integrated value of the ionization signal is maximized during an essentially non-knocking condition; and if a knocking condition occurs, reducing the integrated value of the ionization signal to form a corrected integrated value of the ionization signal.

2. Method according to claim 1, wherein said reduction of the integrated value of the ionization signal is proportional to the intensity of the detected knocking condition.

3. Method according to claim 2, wherein the control parameter of the engine is ignition timing or fuel amount.

4. Method according to claim 1, wherein the corrected integrated value is also maximized during a detected knocking condition.

5. Method according to claim 1, wherein the integrated value of the ionization signal is corrected in a reducing direction in a predetermined amount for a predetermined number of consecutive succeeding combustions.

6. Method according to claim 5, wherein at least from the second succeeding combustion in the combustion chamber, following an initial knocking condition in the combustion chamber, the integrated value of the ionization signal is reduced, said reduction being dependent on the intensity of the initial knocking condition and being successively decreased for each succeeding combustion.

7. Method according to claim 1, wherein if a knocking condition occurs, a knock signal is generated and the knock signal from each combustion is averaged with knock signals from preceding combustions.

8. Method according to claim 7, wherein the averaging is performed by using a running average where the knock signal from the latest combustion is averaged with the previously averaged knock value, and the averaged knock signal thus formed is used for reduction of the integrated value of the ionization signal.

9. Method according to claim 1, wherein the integrated value of the ionization signal obtained from each combustion is averaged with integrated values from proceeding combustions by using a running average where the integrated value of the ionization signal from the latest combustion is averaged with the previously averaged integrated value of the ionization signal, and the averaged integrated value of the ionization signal is reduced dependent on the knock signal, thus forming a corrected integrated value of the ionization signal, and wherein the corrected integrated value of the ionization signal is used as maximizing criteria for any subsequent varying of the control parameter of the engine.

10. Method according to claim 1, wherein if the knocking exceeds a predetermined value, the control parameter of the engine is varied to reduce knocking rather than to maximize the integrated value of the ionization signal.

11. A fuel control system for a combustion engine having at least one combustion chamber, which comprises:

a position sensor which generates at least one reference position corresponding to a determined crankshaft position for a cylinder of the engine;

an ionization current sensor arranged within the cylinder, which sensor detects the degree of ionization within the cylinder during combustion and produces an ionization signal dependent on the degree of ionization;

an integrating measuring circuit responsive to the ionization signal, which integrating circuit from a first crank angle position in association to the upper dead position of the piston and until a second crank angle position at least 40 crankshaft degrees after the first crank angle position, integrates the ionization signal developed during the combustion, and from each combustion produces an integrated value of the ionization signal;

a knock sensor for detecting a knocking condition developed during combustion which sensor produces a knock signal proportioned to the intensity of the knocking condition;

a signal correcting circuit for reducing the integrated value of the ionization signal dependent on the intensity of the knock signal to form a corrected integrated value of the ionization signal; and a control unit having a memory which continuously varies at least one control parameter of the engine according to a predetermined control algorithm stored in the memory of the control unit, which control algorithm maximizes the corrected integrated value of the ionization signal.

12. A fuel control system according to claim 11, wherein the sensor element of the ionization sensor comprises a spark plug arranged within the combustion chamber, from which spark plug the ionization signal is extracted and wherein the knocking sensor comprises a frequency filter which filters out the frequency content representative of a knocking condition from the ionization signal.

* * * * *